US011982926B2

(12) United States Patent
Kulbida (10) Patent No.: US 11,982,926 B2
(45) Date of Patent: May 14, 2024

(54) METHOD FOR ELIMINATING VIDEO ECHO IN A PROJECTOR-CAMERA BASED REMOTE COLLABORATIVE SYSTEM

(71) Applicant: Konica Minolta Business Solutions U.S.A., Inc., San Mateo, CA (US)

(72) Inventor: Jie Kulbida, Broomfield, CO (US)

(73) Assignee: Konica Minolta Business Solutions U.S.A., Inc., San Mateo, CA (US)

( * ) Notice: Subject to any disclaimer, the term of this patent is extended or adjusted under 35 U.S.C. 154(b) by 439 days.

(21) Appl. No.: 17/358,641

(22) Filed: Jun. 25, 2021

(65) Prior Publication Data

US 2022/0413367 A1    Dec. 29, 2022

(51) Int. Cl.
*G03B 17/54* (2021.01)
*H04N 5/272* (2006.01)
*H04N 7/14* (2006.01)
*H04N 7/15* (2006.01)
*G10K 11/178* (2006.01)

(52) U.S. Cl.
CPC .............. *G03B 17/54* (2013.01); *H04N 5/272* (2013.01); *H04N 7/147* (2013.01); *H04N 7/15* (2013.01); *G10K 11/178* (2013.01); *G10K 2210/505* (2013.01)

(58) Field of Classification Search
CPC .................. G03B 17/54; G10K 11/178; G10K 2210/505; H04N 5/272; H04N 7/147; H04N 7/15
See application file for complete search history.

(56) References Cited

U.S. PATENT DOCUMENTS

| | | | |
|---|---|---|---|
| 8,698,873 B2 | 4/2014 | Barrus | |
| 9,560,314 B2 | 1/2017 | Junuzovic et al. | |
| 10,789,780 B1* | 9/2020 | Beck | G06T 11/60 |
| 2005/0180631 A1 | 8/2005 | Zhang et al. | |
| 2006/0203208 A1* | 9/2006 | Thielman | G03B 17/54 |
| | | | 353/74 |
| 2011/0292347 A1* | 12/2011 | Zhang | G03B 21/00 |
| | | | 353/121 |
| 2012/0320157 A1 | 12/2012 | Junuzovic et al. | |
| 2014/0168267 A1* | 6/2014 | Kim | G06F 3/0304 |
| | | | 345/633 |
| 2019/0297307 A1* | 9/2019 | Tseng | H04N 9/3179 |
| 2021/0097719 A1* | 4/2021 | Kulbida | G06T 7/33 |

* cited by examiner

*Primary Examiner* — Magda Cruz
(74) *Attorney, Agent, or Firm* — Osha Bergman Watanabe & Burton LLP (57) ABSTRACT

A method is disclosed for eliminating potential video echo effect for a collaboration session that utilizes AR environments. During the collaboration session and in the local AR environment, a contact overlap mask is generated that identifies a content overlap region where the projected remote content superimposes over the physical object placed on the local workspace surface. Based on the contact overlap mask, the local AR environment is temporarily modified throughout a short time period when the projected remote content is prevented from superimposing over the physical object within the content overlap region. A local image is generated based on the temporarily modified local AR environment and sent to the remote workstation for sharing in the collaboration session. By excluding any projected remote content from superimposing over the physical object in the local image, a potential video feedback loop is eliminated so as to eliminate any potential video echo effect.

20 Claims, 8 Drawing Sheets

METHOD FOR ELIMINATING VIDEO ECHO IN A PROJECTOR-CAMERA BASED REMOTE COLLABORATIVE SYSTEM

BACKGROUND

Augmented Reality (AR) allows a user to interact with a computer-generated output overlaid on or around objects in a real-world environment. The real-world environment augmented by the overlaying computer-generated output is referred to as the AR environment. In other words, the AR environment is the combination of the real-world environment and the overlaying computer-generated output. In some cases, the computer-generated output may be a video stream captured from a remote workspace surface and projected onto a local workspace surface (i.e., the real-world environment) such that the remote user and local user share a collaborative desktop.

Collaborative session is an interactive meeting among multiple participants. Collaborative session participants (referred to as users) may share collaborative contents using AR environments. When the AR environments are generated where each user has a camera and a projector, a video feedback loop is created causing the video to become useless in a manner similar to audio feedback which results in high pitch squealing. The video echo is the appearance of the video projection captured by a camera and inserted back into the video projection with a transmission/processing delay. This problem is analogous to audio echo in telephone communications where the person speaking hears a delayed version of his own voice that may become increasingly corrupted by ongoing echo over time.

SUMMARY

In general, in one aspect, the invention relates to a method to eliminate video echo for a collaboration session. The method includes detecting, using a local camera of a local workstation, a change in local content on a local workspace surface of the local workstation, wherein the change in the local content is created by a physical object placed on the local workspace surface, projecting, using a local projector of the local workstation, remote content onto the local workspace surface, wherein the remote content is received from a remote workstation, wherein the local content and the projected remote content on the local workspace surface collectively form a local augmented reality (AR) environment, generating an contact overlap mask that identifies a content overlap region where the projected remote content superimposes over the physical object, preventing, for a pre-determined time period and within the content overlap region, the projected remote content from superimposing over the physical object, wherein the local AR environment is temporarily modified during the pre-determined time period, generating a local image based on the temporarily modified local AR environment, and sending the local image to a remote workstation for the collaboration session.

In general, in one aspect, the invention relates to a system to eliminate video echo for a collaboration session. The system includes a local workstation comprising a local camera, a local projector, and a local workspace surface, a remote workstation comprising a remote camera, a remote projector, and a remote workspace surface, and a computer processor that detects, using the local camera, a change in local content on the local workspace surface, wherein the change in the local content is created by a physical object placed on the local workspace surface, projects, using the local projector, remote content onto the local workspace surface, wherein the remote content is received from the remote workstation, wherein the local content and the projected remote content on the local workspace surface collectively form a local augmented reality (AR) environment, generates an contact overlap mask that identifies a content overlap region where the projected remote content superimposes over the physical object, prevents, for a pre-determined time period and within the content overlap region, the projected remote content from superimposing over the physical object, wherein the local AR environment is temporarily modified during the pre-determined time period, generates a local image based on the temporarily modified local AR environment, and sends the local image to the remote workstation for the collaboration session.

In general, in one aspect, the invention relates to a non-transitory computer readable medium (CRM) storing computer readable program code to eliminate video echo for a collaboration session. The computer readable program code, when executed by a computer processor, comprises functionality for detecting, using a local camera of a local workstation, a change in local content on a local workspace surface of the local workstation, wherein the change in the local content is created by a physical object placed on the local workspace surface, projecting, using a local projector of the local workstation, remote content onto the local workspace surface, wherein the remote content is received from a remote workstation, wherein the local content and the projected remote content on the local workspace surface collectively form a local augmented reality (AR) environment, generating an contact overlap mask that identifies a content overlap region where the projected remote content superimposes over the physical object, preventing, for a pre-determined time period and within the content overlap region, the projected remote content from superimposing over the physical object, wherein the local AR environment is temporarily modified during the pre-determined time period, generating a local image based on the temporarily modified local AR environment, and sending the local image to a remote workstation for the collaboration session.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, a system, and a non-transitory computer readable medium (CRM) for eliminating potential video echo effect for a collaboration session that utilizes the AR environments. During the collaboration session and in the local AR environment, a contact overlap mask is generated that identifies a content overlap region where the projected remote content superimposes over the physical object placed on the local workspace surface. Based on the contact overlap mask, the local AR environment is temporarily modified throughout a short time period when the projected remote content is prevented from superimposing over the physical object within the content overlap region. A local image is generated based on the temporarily modified local AR environment and sent to the remote workstation for sharing in the collaboration session. By excluding any projected remote content from superimposing over the physical object in the local image, a potential video feedback loop is eliminated so as to eliminate any potential video echo effect.

Figure 1:
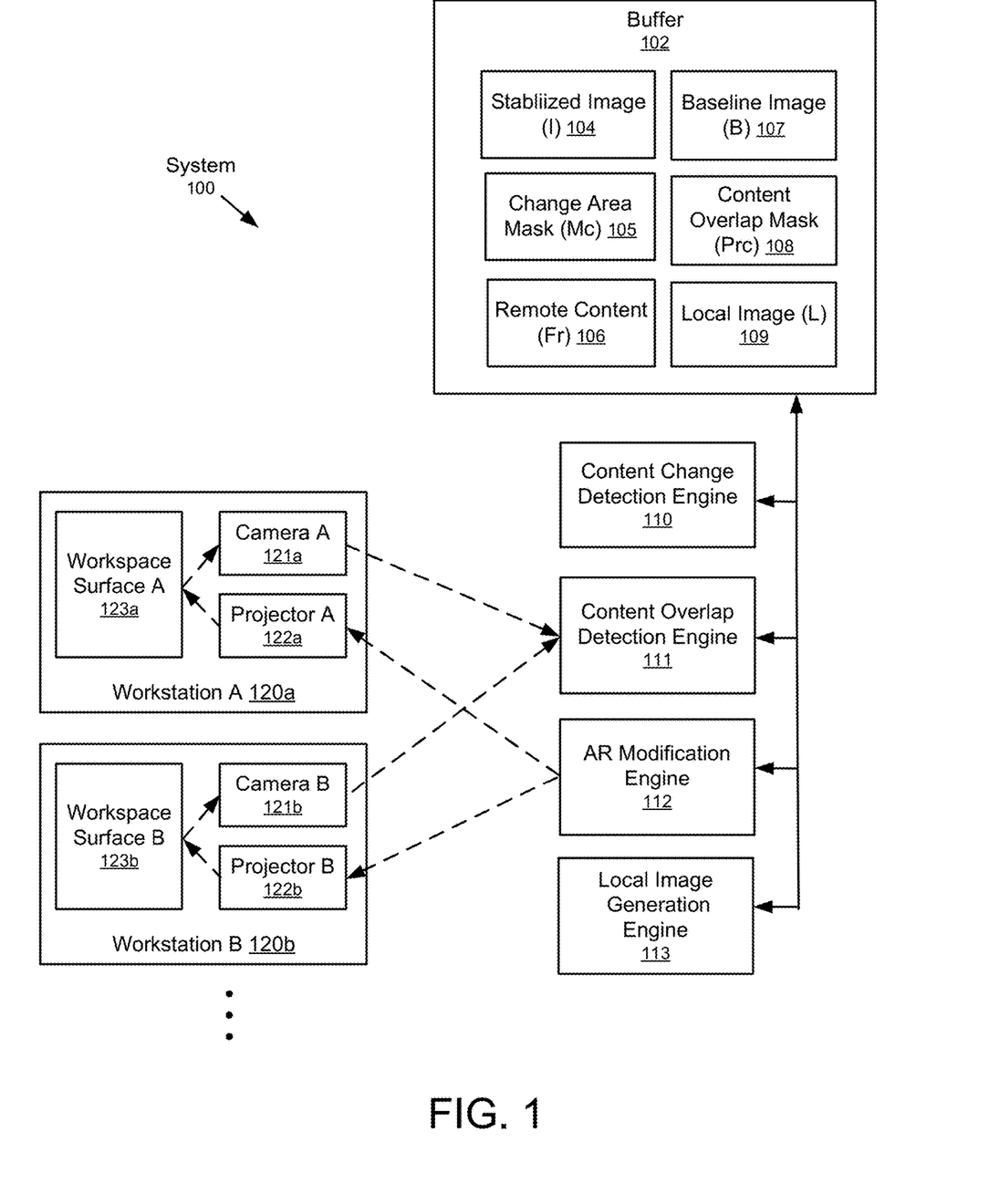
FIG. 1 shows a system in accordance with one or more embodiments of the invention.

FIG. 1 shows a system in accordance with one or more embodiments of the invention. As shown in FIG. 1, the system (100) has multiple components that may include, for example, a buffer (102), a content change detection engine (110), a content overlap detection engine (111), an augmented reality (AR) modification engine (112), and a local image generation engine (113). Furthermore, the system (100) has multiple workstations (e.g., workstation A (120a), workstation B (120b), etc.) located at separate physical locations that communicate with these components (102, 110, 111, 112, and 113). Each of these components (102, 110, 111, 112, and 113) may be located on the same computing device (e.g., a personal computer (PC), laptop, tablet PC, smartphone, multifunction peripheral, kiosk, server, workstation, etc.) or on different computing devices connected by a network of any size having wired and/or wireless segments. Each of these components and workstations is discussed below.

The buffer (102) may be implemented in hardware (i.e., circuitry), software, or any combination thereof. The buffer (102) is configured to store a stabilized image (104), a change area mask (105), a remote content (106), a baseline image (107), a content overlap mask (108), and a local image (109). Multiple sets of stabilized image (104), change area mask (105), remote content (106), baseline image (107), content overlap mask (108), and local image (109) may be stored in the buffer (102). The stabilized image (104), change area mask (105), remote content (106), baseline image (107), content overlap mask (108), and local image (109) may be saved in the buffer (102) in any size and any imaging format (e.g., a JPEG image, a GIF image, a bitmap image, a TIFF image, or a PDF document). Further, the terms "stabilized image, change area mask, remote content, baseline image, content overlap mask, and local image" may be abbreviated as "I, $M_c$, $F_r$, B, $P_{rc}$, and L", respectively, throughout the description below.

Each workstation may include a camera and a projector that are oriented toward the workspace surface to create an AR environment of the collaborative session. For example, workstation A (120a) includes camera A (121a) and projector A (122a) that are oriented toward the workspace surface A (123a) and workstation B (120b) includes camera B (121b) and projector B (122b) that are oriented toward the workspace surface B (123b), etc. Each camera (e.g., camera A (121a) and camera B (121b)) may be any off-the-shelf camera without special optics or hardware. Each projector (e.g., projector A (122a) and projector B (122b)) may be any off-the-shelf projector without special optics or hardware. Alternatively, the camera and projector of a workstation may be customized devices with special optics or hardware. Each workspace surface (e.g., workspace surface A (123a) and workspace surface B (123b)) may be a surface of any type (e.g., a desk, a wall, a whiteboard, and a floor). The workspace surface may be a planar surface. Alternatively, the workspace surface may be a curved surface. Each workstation may further include hardware and/or software with computing and communication functionality to interface with the components (102, 110, 111, 112, and 113).

In one or more embodiments of the invention, the video echo effect potentially appearing in the workstation A (120a) is eliminated or substantially reduced when the user (referred to as the local user) of the workstation A (120a) is collaborating with another user (referred to as the remote user) of the workstation B (120b). In this context, the workstation A (120a), the workspace surface A (123a), and the camera A (121a) are referred to as a local workstation, a local workspace surface, and a local camera, respectively. In particular, the content (e.g., physical object, hand writing/drawing, etc.) placed on the local workspace by the local user is referred to as the local content. Throughout the descriptions below, the term "local content" may also refer to a digital image of the local content in the physical form and/or data derived from such digital image. In contrast, the workstation B (120b), the workspace surface B (123b), and the camera B (121b) are referred to as a remote workstation, a remote workspace surface, and a remote camera. In particular, the content (e.g., physical object, hand writing/drawing, etc.) placed on the remote workspace surface by the remote user is referred to as the remote content. Throughout the descriptions below, the term "remote content" may also refer to a digital image of the remote content in the physical form and/or data derived from such digital image. During the collaborative session, the remote content and/or a change in the remote content is sent to the local workstation and is referred to as the remote update.

The stabilized image (104) is an image of the local workspace surface (i.e., workspace surface A (123a)). In one or more embodiments of the invention, the image of the local workspace surface is captured by the camera A (121a) periodically to detect any change in the local content. Subsequent to a detected change in the local content, the stabilized image (104) is updated after the change stabilizes in the captured image. For example, a sequence of images may be captured while the user's hand hovers over the workspace surface A (123a) to place an physical object or write/draw certain text/pattern. The local content change stabilizes after the user removes the hand from over the workspace surface A (123a). Specifically, the captured image that has been stable without change in the local content for a pre-determined time period (e.g., 1 second) is saved as the stabilized image (104). The stabilized image (104) may be referred to as I throughout the description below.

The change area mask (105) is a binary mask that identifies the area of the local content change between the current version and the previous version of the stabilized image (104). Based on the context, the change area mask (105) or the area identified by the change area mask (105) may be referred to as $M_c$ throughout the description below.

The remote content (106) is a representation of the content (e.g., physical object, hand writing/drawing, etc.) placed on the remote workspace by the remote user and shared with the local user. In one or more embodiments of the invention, during the collaborative session, the remote content (106) is projected onto the local workspace surface to create the AR environment (referred to as the local AR environment) of the workstation A (120a). In particular, the remote update is periodically received by the local workstation to maintain consistency between the projected remote content in the local AR environment and the actual content placed on the remote workspace surface. In one or more embodiments, the remote content (106) excludes the background of the remote workspace image and is referred to as the remote foreground content. The remote content (106) may be referred to as $F_r$ throughout the description below.

During the collaborative session, the stabilized image (104) includes a combination of local content and projected remote content whichever is present. The change detection is paused prior to updating the projected image with the newly arrived remote content, and is turned back on after the camera captures a new baseline image that contains the new remote update. Therefore the new remote update does not cause a new stabilized image to be created.

The baseline image (107) is an image of the local workspace surface that is used as a basis to detect any change in the local content. Subsequent to a detected change in the local content, the stabilized image (104) is updated after the change stabilizes in the captured image. The updated stabilized image (104) is saved as a new version of the baseline image (107). Subsequent to receiving a remote update, the stabilized image (104) is updated after the projected remote update is included in the captured image. The updated stabilized image (104) is saved as a new version of the baseline image (107). The baseline image (107) may be referred to as B throughout the description below.

The content overlap mask (108) is a binary mask that identifies the area where the change area mask (105) and the remote content (106) (in particular, the remote foreground content) overlaps. Based on the context, the content overlap mask (108) or the area identified by the content overlap mask (108) may be referred to as $P_{rc}$ throughout the description below.

The local image (109) is an image of the local content excluding any remote content. In one or more embodiments of the invention, the local image (109) is a derived image instead of a directly captured image of the local workspace surface. Because the directly captured image of the local workspace surface may contain both local and remote content, in order to prevent the video echoing effect, the derived local image (109) does not contain projected remote content and is used for sharing with remote workstation(s) during the collaborative session. The local image (109) may be referred to as L throughout the description below.

In one or more embodiments, the system (100) further includes the content change detection engine (110). The content change detection engine (110) may be implemented in hardware (i.e., circuitry), software, or any combination thereof. As noted above, during the collaboration session, the remote content received from the remote workstation is projected onto the local workspace surface to form the local AR environment. The content change detection engine (110) is configured to detect, using the local camera, a change in the local content on the local workspace surface. In particular, the change in the local content is created by a physical object placed by the local user on the local workspace surface. The content change detection engine (110) is further configured to capture, using the local camera and subsequent to stabilization of the change in the local content, a stabilized image (referred to as the first stabilized image) of the local AR environment.

In one or more embodiments, the system (100) further includes the content overlap detection engine (111). The content overlap detection engine (111) may be implemented in hardware (i.e., circuitry), software, or any combination thereof. The content overlap detection engine (111) is configured to generate a change area mask that identifies a portion of the first stabilized image that corresponds to the physical object, and to generate an contact overlap mask that identifies a content overlap region where the projected remote content superimposes over the physical object.

In one or more embodiments, the system (100) further includes the AR modification engine (112). The AR modification engine (110) may be implemented in hardware (i.e., circuitry), software, or any combination thereof. The AR modification engine (110) is configured to temporarily modify the local AR environment during a pre-determined time period by preventing the projected remote content from superimposing over the physical object within the content overlap region. As noted above, preventing the projected remote content from superimposing on the physical object within the content overlap region eliminates a potential video echo effect.

In one or more embodiments, the system (100) further includes the local image generation engine (113). The local image generation engine (113) may be implemented in hardware (i.e., circuitry), software, or any combination thereof. The local image generation engine (113) is configured to generate a local image based on the temporarily modified local AR environment, and to send the local image to the remote workstation for the collaboration session.

The change detection engine (110), content overlap detection engine (111), AR modification engine (112), and local image generation engine (113) collectively perform the functionalities described above using the method described in reference to FIGS. 2A-2C below.

Although the system (100) is shown having six components (102, 110, 111, 112, and 113) communicating with two workstations (120a and 120b), in other embodiments of the invention, the system (100) may have more or fewer components communicating with any number of workstations. Furthermore, the functionality of each component described above may be shared among multiple components. For example, the alignment engine (114), or a portion thereof, may be embedded within the CT engine (111) and/or the PT engine (112). The components (102, 110, 111, 112, and 113) may be centralized and remotely located from the workstations. Alternatively, the functionality of one or more of the components (102, 110, 111, 112, and 113) may be distributed and/or duplicated in one or more workstations. In addition, each component (102, 110, 111, 112, and 113) may be utilized multiple times in serial or parallel to carry out an iterative operation.

Figure 2A:
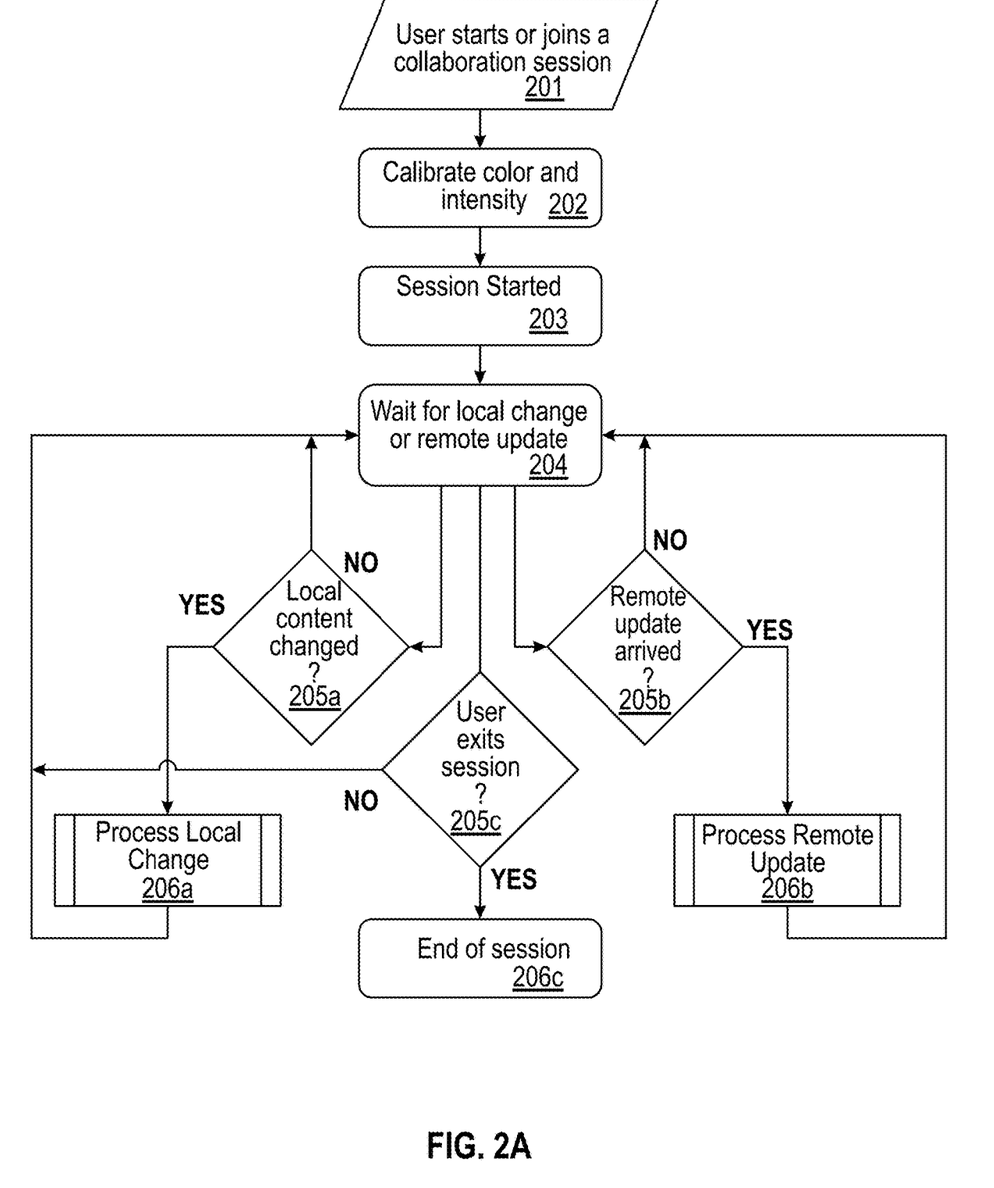
FIGS. 2A-2C show flowcharts in accordance with one or more embodiments of the invention.
Figure 2B:
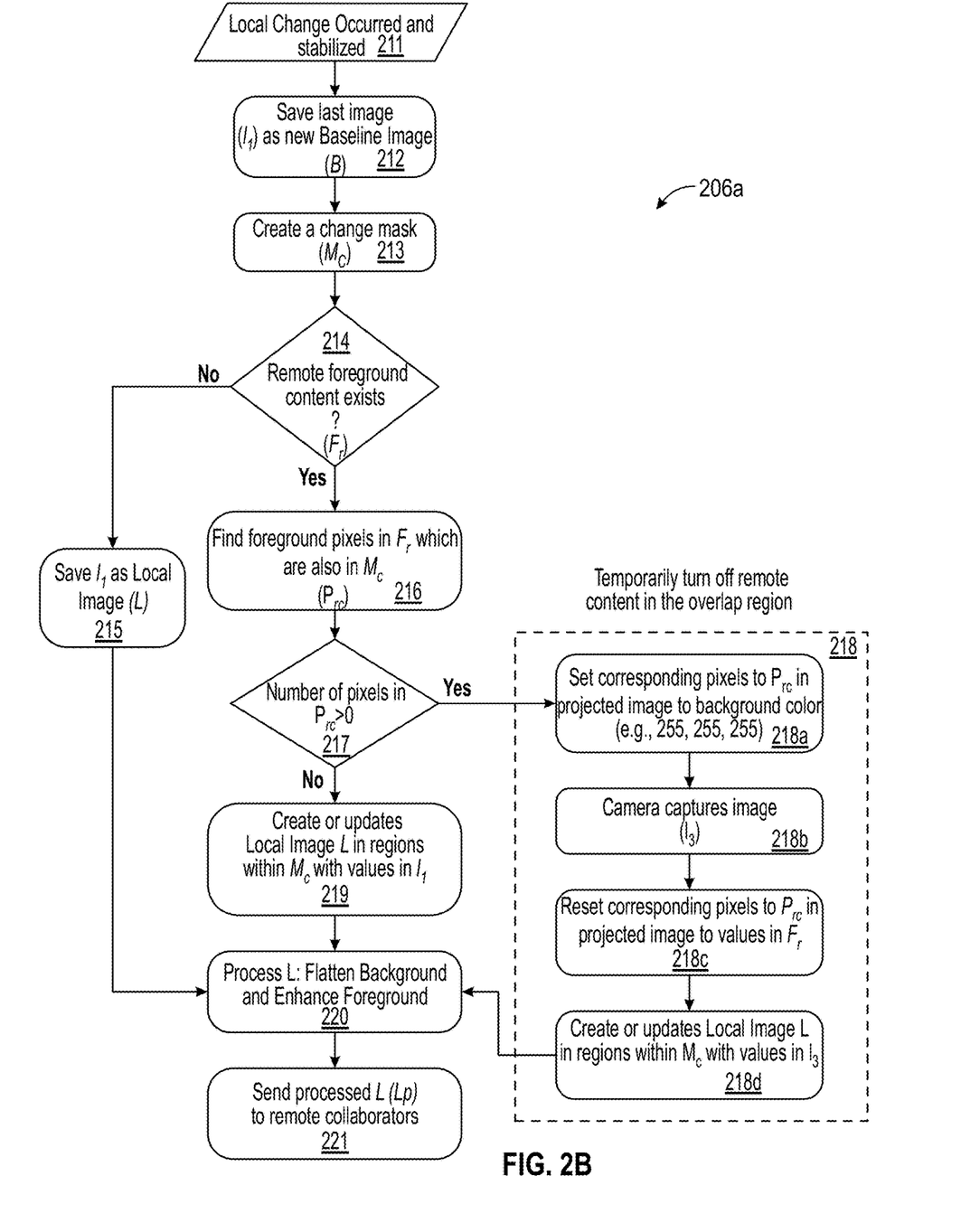
Figure 2C:
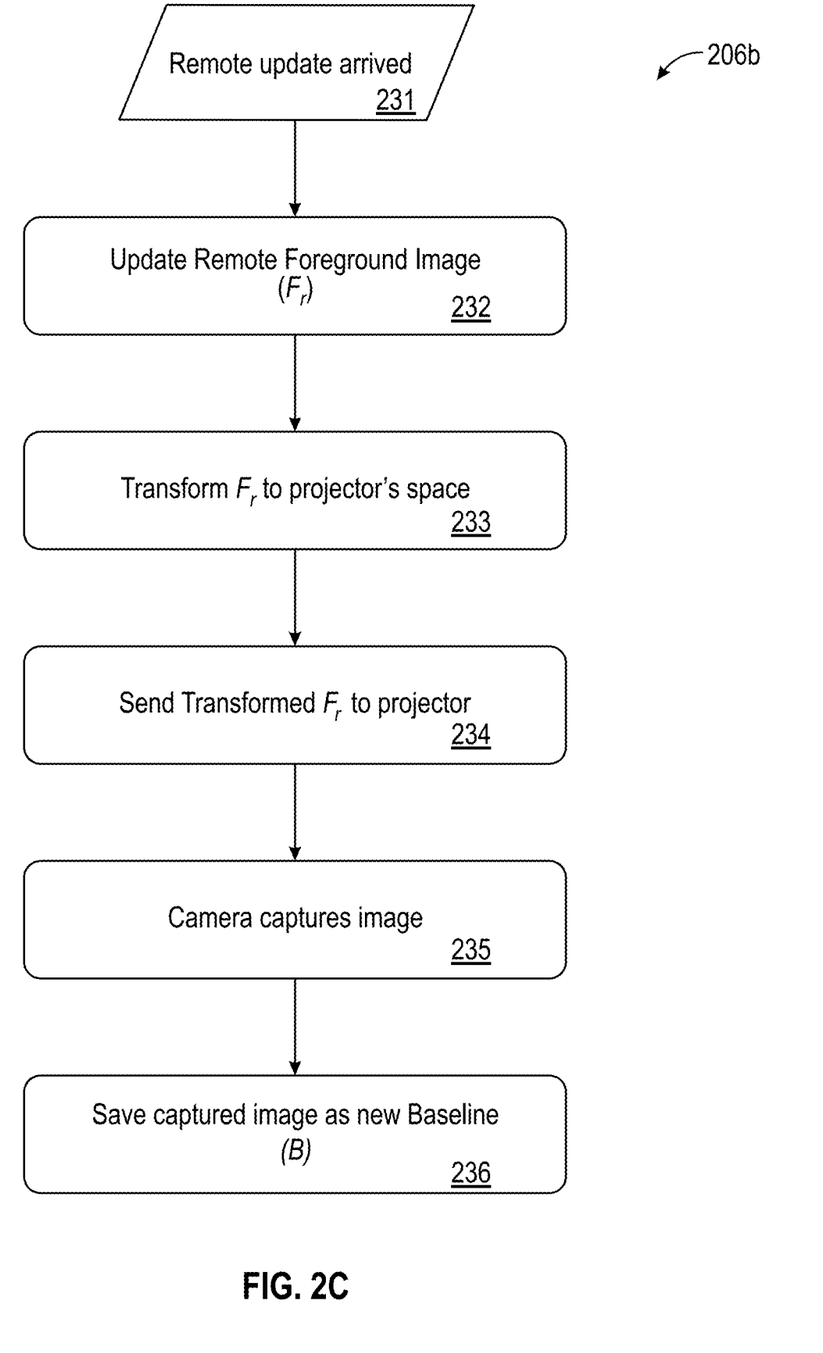

FIGS. 2A-2C show flowcharts in accordance with one or more embodiments of the invention. One or more of the steps in FIGS. 2A-2C may be performed by the components of the system (100), discussed above in reference to FIG. 1. In one or more embodiments of the invention, one or more of the steps shown in FIGS. 2A-2C may be omitted, repeated, and/or performed in a different order than the order shown in FIGS. 2A-2C. Accordingly, the scope of the invention should not be considered limited to the specific arrangement of steps shown in FIGS. 2A-2C.

As described above, FIGS. 2A-2C shows a method for eliminating video echo in a projector-camera based remote collaborative system, such as the system (100) depicted in FIG. 1 above. More specifically, the method eliminates the video echo by temporarily removing projected remote content over local objects (e.g., 3D object) when the local workspace surface image is captured for sharing with the remote workstation. In particular, the method eliminates the video echo regardless of uncertainty of the projected content location on the local workspace surface due to the 3D object surface curvature and camera's perspective.

As shown in FIG. 2A, initially in Block 201, a collaboration session is started by a user. For example, the local user may send an electronic invitation to the remote user to share collaborative contents. In another example, the local user may accept an electronic invitation from the remote user to share collaborative contents.

In Block 202, the calibration is performed. The spatial calibration is performed by projecting a matrix of unique markers (e.g., Augmented Reality University of Cordoba (ArUco) markers) onto the workspace surface where the camera is instructed to capture an image of the markers. A spatial relationship is established between the camera's imaging plane and the projector based on the correspondence between the markers in the captured image and the markers sent to the projector. Results of the calibration are saved as a series of transformations, each of which will be used to convert an image from one space to another, e.g., from image captured by a camera to image to be sent to the projector, or vice versa. Accurate mapping between these spaces allows a seamlessly integration of both physical and virtual content, which is consistent across multiple networked workstations. The transformation between the spaces may contain both linear and non-linear components. The non-linear component removes the distortion introduced by camera lens, whereas the linear component corrects for perspective distortion, scaling, rotation, and magnification.

In addition to the spatial calibration, color and intensity calibration is performed by projecting a white background onto the workspace surface where a series of operations are performed to calibrate the camera, so that the images captured from multiple workstations (e.g., under different ambient light conditions) are as close to the same color and intensity as possible.

To correct for color variance, one or more captured images of the workspace surface projected with the white background are analyzed. Based on the ratio between the mean intensity of the color channels, a set of coefficients are computed and sent to the camera for white balance adjustments. If the camera does not support white balance internally, the coefficients are stored in computer memory and used to perform white balance correction in software. This process may require several iterations to adequately equalize the intensities from color channels. Once color calibration is completed, an iterative process is performed to adjust the camera's exposure, gain, or both, to bring the average intensity of the captured white background image to a target intensity level. The target intensity level is an adjustable parameter, with a default value of 160.

In Block 203, content sharing in the collaborative session is started after both the spatial calibration and the color and intensity calibration are completed.

In Block 204, upon entering a collaboration session, the camera periodically captures images of the workspace surface while the user interacts with the AR environment. The method performs a wait loop from Block 204 to Block 205*a*, Block 205*b*, and Block 205*c* in a rotating manner.

In Block 205*a*, a determination is made as to whether a local content change is detected. If the determination is positive, i.e., the local content change is detected, the method proceeds to Block 206*a* where the local content change is processed. In particular, any local content change is sent automatically to remote collaborators whenever a stable change in the local workspace surface image is detected. Additional details of Block 206*a* are described in reference to FIG. 2B below. If the determination is negative, i.e., no local content change is detected, the method returns to Block 204. Subsequent to returning to Block 204 from Block 205*a*, the method wait loop proceeds to Block 205*b*.

In Block 205*b*, a determination is made as to whether a remote update is received. If the determination is positive, i.e., the remote update is received, the method proceeds to Block 206*b* where the remote update is processed. In particular, any received remote update triggers an update to the projected content onto the local workspace surface, which leads to a change to the overall content on the local workspace surface. Additional details of Block 206*b* are described in reference to FIG. 2C below. If the determination is negative, i.e., no remote update is received, the method returns to Block 204. Subsequent to returning to Block 204 from Block 205*b*, the method wait loop proceeds to Block 205*c*.

In Block 205*c*, a determination is made as to whether an user exit command is received. If the determination is positive, i.e., the user exit command is received, the method proceeds to Block 206*c* where the collaborative session is ended. If the determination is negative, i.e., the user exit command is not received, the method returns to Block 204. Subsequent to returning to Block 204 from Block 205*b*, the method wait loop proceeds to Block 205*a*.

Based on the iteration from the Block 204 through the Blocks 205*a* and 205*b*, the flow of collaborative information to and from each workstation happen concurrently, and each collaborative information flow is handled atomically in the software. In other words, when an update, local or remote, is being processed, another update will not start until the previous one is finished. This ensures that the software is aware of the source of each change observed in the image, and therefore is able to keep track of the local and remote content separately.

While the wait loop described above is based on proceeding from Block 204 to Block 205*a* first, followed by Block 205*b*, and then Block 205*c* before restarting the sequence, the wait loop may also be performed based on other sequential order, based on a combination of different sequential orders, or based on a random order.

FIG. 2B shows details of Block 206*a* depicted in FIG. 2A above. Specifically, FIG. 2B shows the process of handling a change to the local content.

Initially in Block 211, a local content change occurred and stabilized where a stabilized image $I_1$ is captured. For example, the local user may initiate the collaboration session and places a physical object on the local workspace surface, or writing/drawing on the local workspace surface with a pen or marker.

In Block 212, the most recent stabilized image $I_1$ is saved as a new baseline image B.

In Block 213, a change mask $M_c$ is created to identify the local content change that leads to the stabilized image $I_1$. For example, the change mask $M_c$ identifies within the stabilized image $I_1$ where the physical object or writing/drawing is placed on the local workspace surface.

In Block 214, a determination is made as to whether any remote foreground content $F_r$ exists and is being projected onto the local workspace surface. In other words, whether $F_r$ exists in $I_1$. If the determination is positive, i.e., some $F_r$ is found in $I_1$, the method proceeds to Block 216. If the determination is negative, i.e., no $F_r$ is found in $I_1$, the method proceeds to Block 215.

In Block 215, the stabilized image $I_1$ is saved as the last known local image L and the method proceeds to Block 220.

In Block 216, remote foreground pixels in $F_r$ that are also in $M_c$, i.e., fall within the area where change occurred, are identified to generate the content overlap mask $P_{rc}$.

In Block 217, the number of set pixels in $P_{rc}$ is verified to confirm that non-blank $F_r$ exists in $I_1$. Specifically, a determination is made as to whether the number of set pixels in $P_{rc}$ is greater than 0. If the determination is positive, i.e., the number of set pixels in $P_{rc}$ is greater than 0, the method proceeds to Block 218. If the determination is negative, i.e., the number of set pixels in $P_{rc}$ is not greater than 0, the method proceeds to Block 219.

Block 218 includes a sequence of Block 218a through Block 208d.

In Block 218a, the pixels in the remote foreground content $F_r$ that correspond to the area identified by $P_{rc}$ are set to a background pixel value (e.g., 255, 255, 255). This effectively removes the projected remote content within the area where local content change occurred (i.e., $M_c$) from the local AR environment.

In Block 218b, a temporarily modified stabilized image 13 of the local workspace surface is captured with the projected remote content in $M_c$ removed from the local AR environment. Note that in $I_3$, pixels within $M_c$ contains changed local content identified in Block 211 but without the interference of remote foreground content identified in Block 214.

In Block 218c, the pixels in the remote foreground content $F_r$ that correspond to the area identified by $P_{rc}$ are reset back to their original values in $F_r$. This effectively restores the projected remote content, temporarily removed in Block 218a, to the local AR environment. In other words, the local AR environment is temporarily modified during the time period between removing and restoring the projected remote content in $M_c$. The time period is selected to be sufficiently short so as to minimize any visual disruption to the local user as a result of temporarily modifying the AR environment. For example, the time period may be 100 millisecond.

In Block 218d, the previously generated local image L is updated, at pixel locations within $M_c$, with corresponding pixel values in $I_3$. Equation below depicts the operation performed on the foreground pixels in the local image (L) where the background is assumed to have pixel values "0".

$$L=(I_3 \cap M_c) \cup L$$

In Block 220, the updated local image L is processed by flattening the background and enhancing the foreground to generate the processed local image $L_p$.

In Block 221, the processed local image $L_p$ is sent to the remote users.

As shown in FIG. 2A above, Blocks 211-221 are repeated as collaboration session continues.

FIG. 2C shows details of Block 206b depicted in FIG. 2A above. Specifically, FIG. 2C shows the process of handling an update from a remote workstation. As noted above, any received remote update triggers an update to the projected content onto the local workspace surface, which leads to a change to the overall content in the local AR environment. Upon the local user joining the collaboration session, all collaborative content previously shared by all remote collaborators are received at the local workstation as a combined image, with the background flattened. The combined image is saved as the initial remote foreground content $F_r$. During the collaboration session, the initial remote foreground content $F_r$ is periodically updated as any remote user shares additional collaborative content.

Initially in Block 231, a remote update is received by the local workstation.

In Block 232, the previously saved remote foreground content $F_r$ is updated based on the received remote update.

In Block 233, the updated remote foreground content $F_r$ is transformed into the local projector's space.

In Block 234, the updated and transformed remote foreground content $F_r$ is projected onto the local workspace surface.

In Block 235, the local camera captures an image of the local workspace surface as soon as the updated and transformed remote foreground content $F_r$ is projected.

In Block 236, the captured image of the local workspace surface is saved as a new baseline image B.

As shown in FIG. 2A above, Blocks 231-236 are repeated as collaboration session continues.

FIGS. 3A-3E show an implementation example in accordance with one or more embodiments of the invention. The implementation example shown in FIGS. 3A-3E is based on the system and method flowcharts described in reference to FIGS. 1 and 2A-2C above. Specifically, elements depicted in FIG. 1 and FIGS. 3A-3E with like reference designators correspond to each other. In one or more embodiments of the invention, one or more of elements shown in FIGS. 3A-3E may be omitted, repeated, and/or organized in a different arrangement. Accordingly, the scope of the invention should not be considered limited to the specific arrangement of elements shown in FIGS. 3A-3E.

In one or more embodiments, the example implementation shown in FIGS. 3A-3E corresponds to a collaborative session when the local user and remote user, discussed above in reference to FIG. 1, exchange collaborative contents periodically to complete a final work product. As noted above, the calibration session is performed prior to commencing the collaborative session. The calibration session includes the spatial calibration and the color and intensity calibration.

Figure 3A:
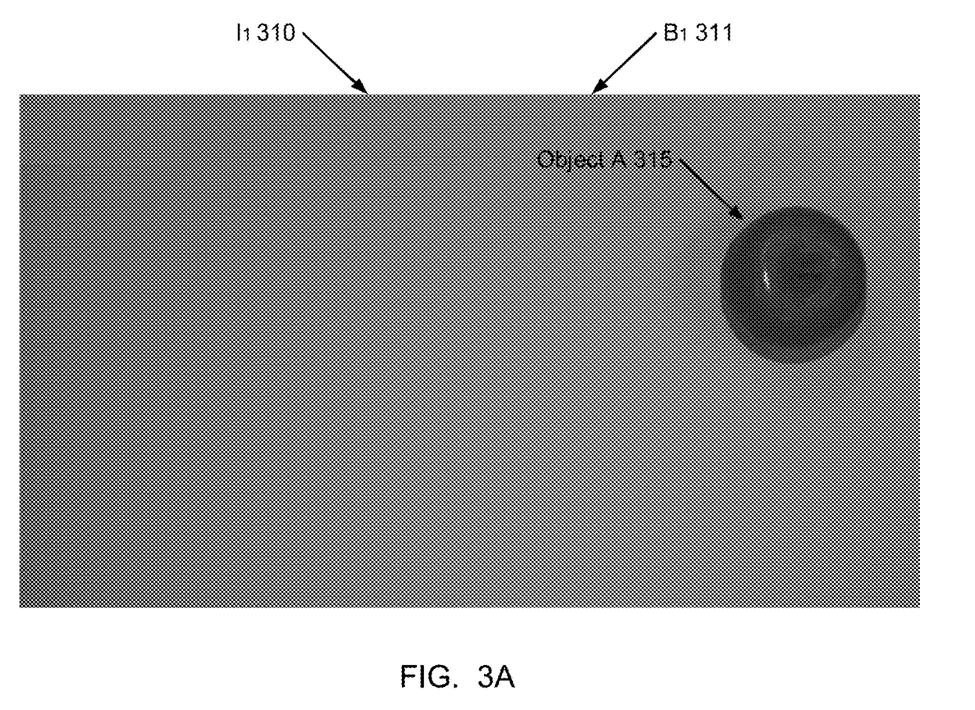
FIGS. 3A-3E show an implementation example in accordance with one or more embodiments of the invention.

As shown in FIGS. 3A-3E, subsequent to the calibration session, the local user and remote user exchange collaborative content in the example collaborative session. In particular, the local user places an apple (i.e., object A (315)) on the local workspace surface. Subsequent to placing the apple when the image captured by the local camera stabilizes, the stabilized image is saved as $I_1$ (310). $I_1$ (310) is also saved as the baseline image $B_1$ (311) that is used for change detection. $I_1$ (310) is transformed, based on the spatial/color/intensity relationships between the local and remote workstations, into the local image ($L_1$) that is sent to the remote workstation of the remote user. FIG. 3A shows $I_1$ (310) and $B_1$ (311) where $L_1$ is not explicitly shown.

Upon receiving the local image ($L_1$) containing the apple, the remote workstation projects $L_1$ onto the remote workspace surface to create the remote AR environment. In response, the remote user annotates the projected $L_1$ with a text label "Apple" and an arrow pointing to it. The remote user then adds another text label "Lemon", an arrow, and a question mark. The text labels "Apple" and "Lemon" with the arrows and question mark are captured using the remote camera and sent to the local workstation as the remote foreground content, which is an example of the remote content (106) shown in FIG. 1A above.

Figure 3B:
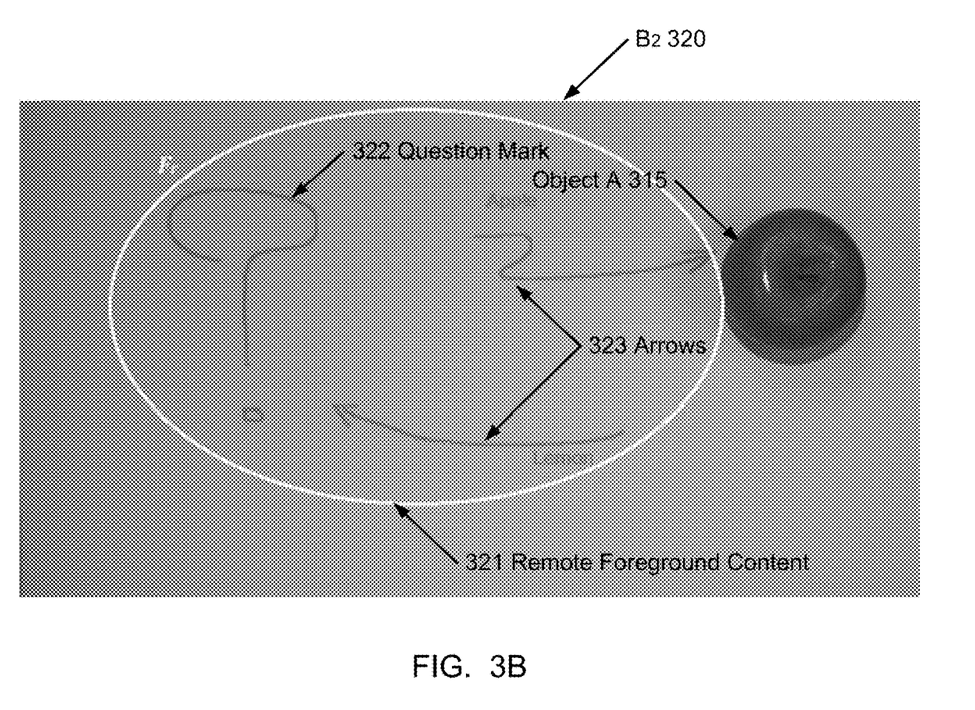

FIG. 3B shows an image of the local workspace surface with the projected remote content. In particular, the remote content is received by the local workstation and transformed based on the spatial/color/intensity relationships between the local and remote workstations. The transformed remote content is projected onto the local workspace surface to overlay with (i.e., superimpose over) the object A (315) in the local AR environment. Specifically, FIG. 3B shows the object A (315) overlaid with the remote foreground content (321), which consists of the text labels "Apple" and "Lemon" with the arrows (323) and question mark (322). The local camera captures the image of the object A (315) overlaid with the remote foreground content (321). The captured image is saved as the baseline image $B_2$ (320) which replaces the previous baseline image $B_1$ (311) for subsequent change detection.

Figure 3C:
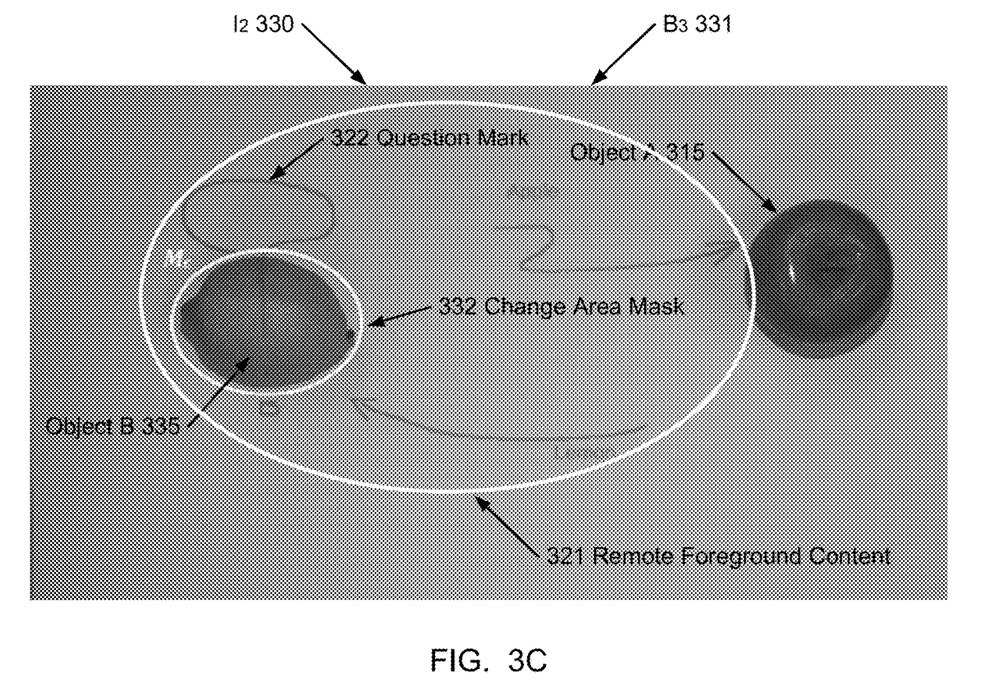

FIG. 3C shows a captured image of the local AR environment where the local user places a lemon (i.e., object B (335)) where the projected question mark (322) is. The change in the local content due to the lemon is detected based on the baseline image $B_2$ (320). Accordingly, when the change stabilizes, the captured image is saved as the stabilized image I2 (330) to replace the previous stabilized image $I_1$ (310). In particular, $I_1$ (310) corresponds to an iteration traversing Block 215 in FIG. 2B, and $I_2$ (330) corresponds to a subsequent iteration traversing Block 216 through Block 219 in FIG. 2B. The change area mask (332) is generated as $M_c$ based on the difference between the stabilized images $I_1$ (310) and I2 (330). The stabilized image I2 (330) is also saved as the baseline image $B_3$ (331) which replaces the previous baseline image $B_2$ (320) for subsequent change detection. As shown in FIG. 3C, the projected question mark (322) superimposes over the physical lemon (i.e., object B (335)) in the stabilized image I2 (330).

In response to detecting the change in the local content due to the lemon, the portion of the remote foreground content (321) within the change area is identified based on the change area mask (332) to generate the content overlap mask (341). Accordingly, based on the content overlap mask (341), the pixels where the projected question mark (322) superimposes the lemon (i.e., object B (325)) are identified in the remote foreground content (321) and set to the background pixel value to temporarily modify the remote foreground content (321).

Figure 3D:
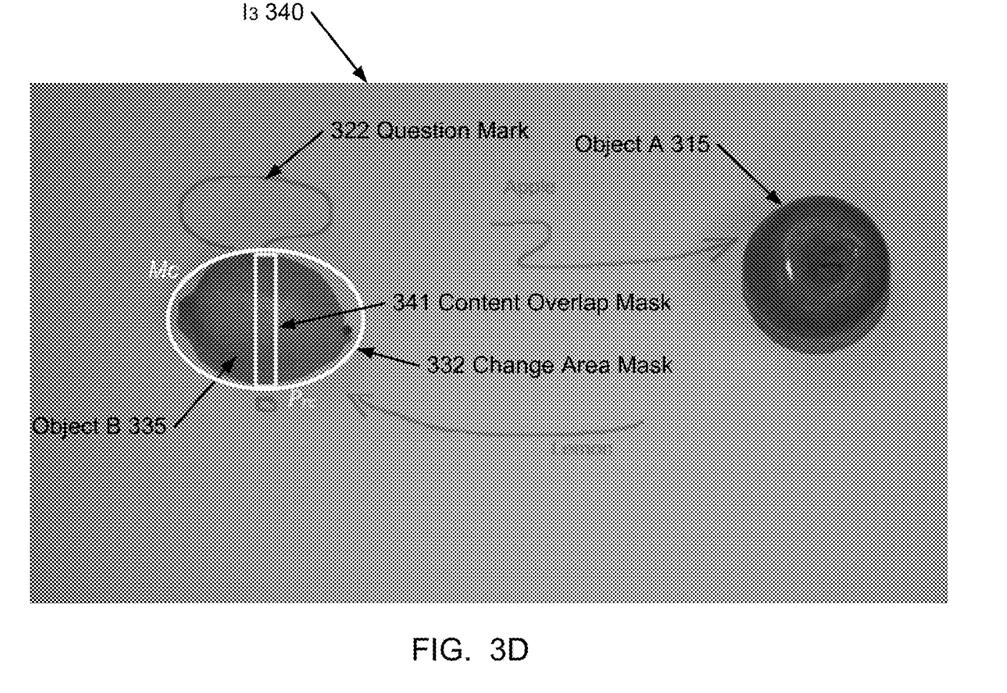

FIG. 3D shows a captured image of the local AR environment where the projection of the remote foreground content (321) is temporarily replaced by the modified version. In particular, the portion of the projected question mark (322) is removed from the lemon (i.e., object B (335)) based on the content overlap mask (341). In response to removing the portion of the projected question mark (322) from the lemon, the captured image is saved as the stabilized image I3 (340) to replace the previous stabilized image $I_2$ (330). As shown in FIG. 3D, the local content of the object B (335) in the stabilized image I2 (330) is not superimposed by the temporarily modified projection of the remote foreground content (321).

Figure 3E:
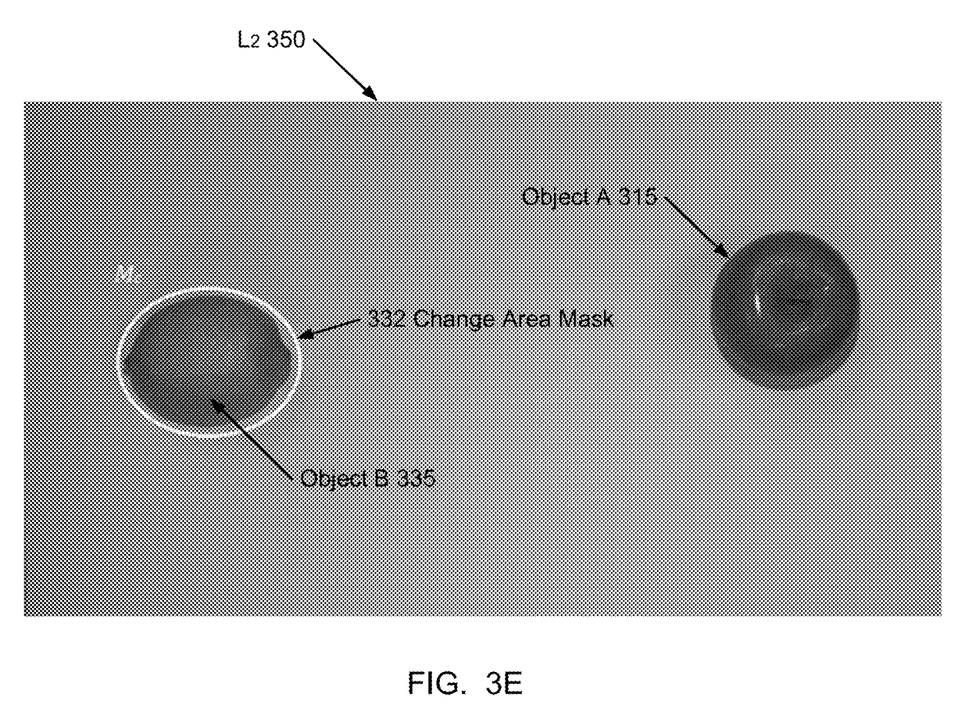

FIG. 3E shows an updated version of the last known local image $L_1$. Specifically, the added lemon (excluding any portion of the projected question mark (322)) is extracted from the I3 (340) based on the change area mask (332) and added to $L_1$ to generate the updated local image $L_2$ (350). Accordingly, $L_2$ (350) includes only the local content without any projected remote content and is used for sharing with the remote user without inducing any video echoing effect.

Figure 4:
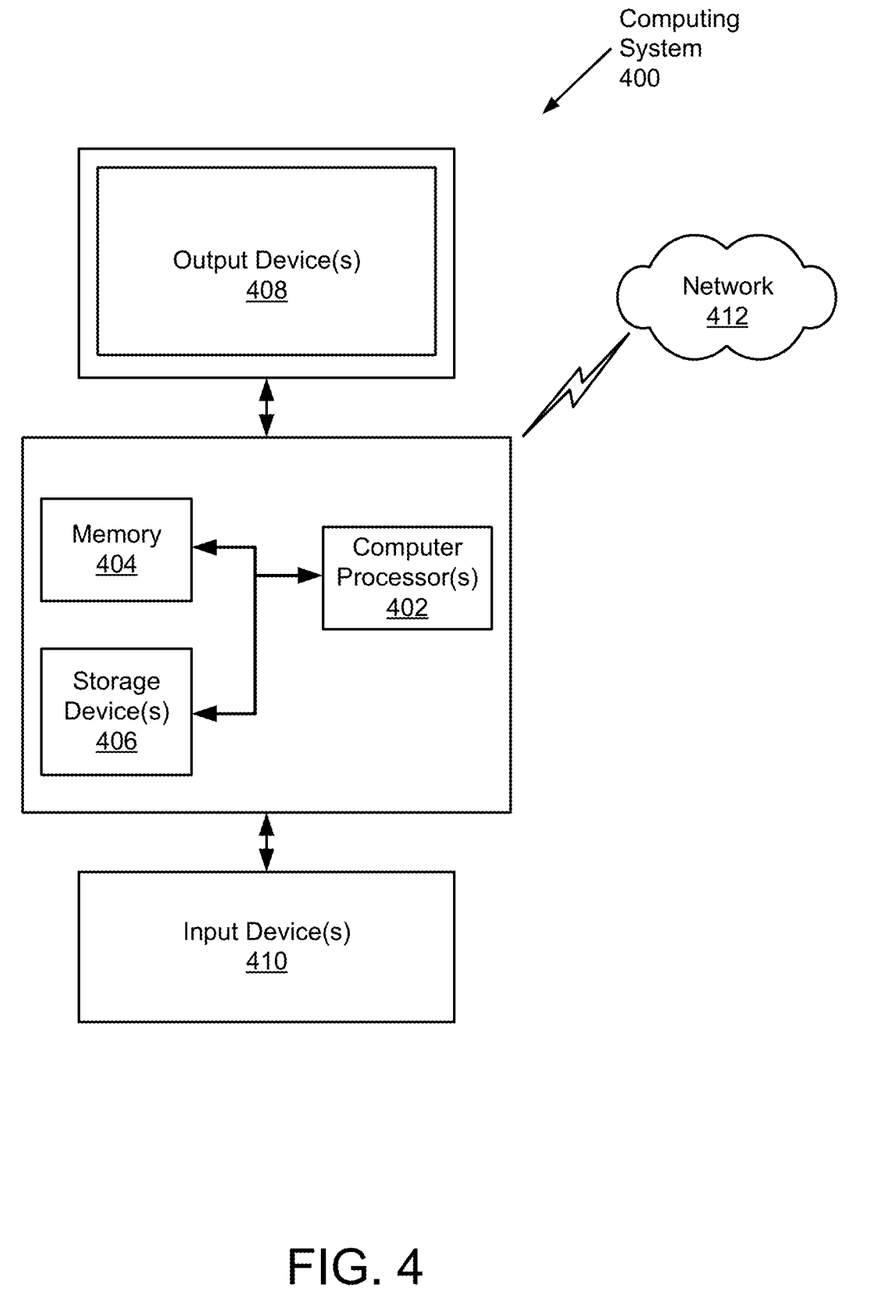
FIG. 4 shows a computing system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and be connected to the other elements over a network (412). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

One or more of the embodiments of the invention may have one or more of the following advantages and improvements over conventional image processing and AR related technologies: the ability to use various cameras and projectors installed at various workstations that have not been previously aligned and calibrated to one another, the ability to use off-the-shelf cameras and projectors without special optics or hardware, the ability to use cameras and projectors where the camera plane and/or projector angle are not parallel to the workspace surface (e.g., drawing paper), the ability to use cameras and projectors with respective positions and angles completely unknown to the system, the ability to use cameras and projectors with minimal user intervention to perform hardware setup or calibration, the ability to use any type of paper (or any other writing medium) with arbitrary paper location on each workstation that may change during the collaborative session.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to eliminate video echo for a collaboration session, comprising:
    detecting, using a local camera of a local workstation, a change in local content on a local workspace surface of the local workstation, wherein the change in the local content is created by a physical object placed on the local workspace surface;
    projecting, using a local projector of the local workstation, remote content onto the local workspace surface, wherein the remote content is received from a remote workstation, wherein the local content and the projected remote content on the local workspace surface collectively form a local augmented reality (AR) environment;
    generating a contact overlap mask that identifies a content overlap region where the projected remote content superimposes over the physical object;
    preventing, for a pre-determined time period and within the content overlap region, the projected remote content from superimposing over the physical object, wherein the local AR environment is temporarily modified during the pre-determined time period;
    generating a local image based on the temporarily modified local AR environment; and
    sending the local image to a remote workstation for the collaboration session.

2. The method of claim 1, further comprising:
    capturing, using the local camera and subsequent to stabilization of the change in the local content, a first stabilized image of the local AR environment; and
    generating a change area mask that identifies a portion of the first stabilized image that corresponds to the physical object,
    wherein the contact overlap mask is generated at least based on the change area mask.

3. The method of claim 2, further comprising:
    identifying foreground pixels in the remote content,
    wherein the contact overlap mask is generated by applying the change area mask to the foreground pixels.

4. The method of claim 2, further comprising:
    capturing, using the local camera and during the pre-determined time period, a second stabilized image of the local AR environment; and
    identifying, based on the change area mask, a portion of the second stabilized image as corresponding to the physical object without being superimposed by the projected remote content,
    wherein the local image is generated by updating a previous local image based on the portion of the second stabilized image that corresponds to the physical object without being superimposed by the projected remote content.

5. The method of claim 1, further comprising:
    identifying, based on the contact overlap mask, a portion of the remote content that corresponds to the content overlap region; and
    setting, throughout the pre-determined time period, pixel values of the portion of the remote content to a background pixel value to prevent the projected remote content from superimposing over the physical object within the content overlap region.

6. The method of claim 5, further comprising:
    resetting, subsequent to the pre-determined time period, the pixel values of the portion of the remote content back to corresponding original pixel values.

7. The method of claim 1,
    wherein preventing, for the pre-determined time period and within the content overlap region, the projected remote content from superimposing on the physical object eliminates a potential video echo effect.

8. A system to eliminate video echo for a collaboration session, comprising:
    a local workstation comprising a local camera, a local projector, and a local workspace surface;
    a remote workstation comprising a remote camera, a remote projector, and a remote workspace surface; and
    a computer processor that
        detects, using the local camera, a change in local content on the local workspace surface, wherein the change in the local content is created by a physical object placed on the local workspace surface;
        projects, using the local projector, remote content onto the local workspace surface, wherein the remote content is received from the remote workstation, wherein the local content and the projected remote content on the local workspace surface collectively form a local augmented reality (AR) environment;
        generates a contact overlap mask that identifies a content overlap region where the projected remote content superimposes over the physical object;
        prevents, for a pre-determined time period and within the content overlap region, the projected remote content from superimposing over the physical object, wherein the local AR environment is temporarily modified during the pre-determined time period;
        generates a local image based on the temporarily modified local AR environment; and
        sends the local image to the remote workstation for the collaboration session.

9. The system of claim 8, the computer processor further
    captures, using the local camera and subsequent to stabilization of the change in the local content, a first stabilized image of the local AR environment; and
    generates a change area mask that identifies a portion of the first stabilized image that corresponds to the physical object,
    wherein the contact overlap mask is generated at least based on the change area mask.

10. The system of claim 9, the computer processor further identifies foreground pixels in the remote content,
    wherein the contact overlap mask is generated by applying the change area mask to the foreground pixels.

11. The system of claim 9, the computer processor further
captures, using the local camera and during the pre-determined time period, a second stabilized image of the local AR environment; and
identifies, based on the change area mask, a portion of the second stabilized image as corresponding to the physical object without being superimposed by the projected remote content,
wherein the local image is generated by updating a previous local image based on the portion of the second stabilized image that corresponds to the physical object without being superimposed by the projected remote content.

12. The system of claim 8, the computer processor further
identifies, based on the contact overlap mask, a portion of the remote content that corresponds to the content overlap region; and
sets, throughout the pre-determined time period, pixel values of the portion of the remote content to a background pixel value to prevent the projected remote content from superimposing over the physical object within the content overlap region.

13. The system of claim 12, the computer processor further
resets, subsequent to the pre-determined time period, the pixel values of the portion of the remote content back to corresponding original pixel values.

14. The system of claim 8,
wherein preventing, for the pre-determined time period and within the content overlap region, the projected remote content from superimposing on the physical object eliminates a potential video echo effect.

15. A non-transitory computer readable medium (CRM) storing computer readable program code to eliminate video echo for a collaboration session, wherein the computer readable program code, when executed by a computer processor, comprises functionality for:
detecting, using a local camera of a local workstation, a change in local content on a local workspace surface of the local workstation, wherein the change in the local content is created by a physical object placed on the local workspace surface;
projecting, using a local projector of the local workstation, remote content onto the local workspace surface, wherein the remote content is received from a remote workstation, wherein the local content and the projected remote content on the local workspace surface collectively form a local augmented reality (AR) environment;
generating a contact overlap mask that identifies a content overlap region where the projected remote content superimposes over the physical object;
preventing, for a pre-determined time period and within the content overlap region, the projected remote content from superimposing over the physical object,
wherein the local AR environment is temporarily modified during the pre-determined time period;
generating a local image based on the temporarily modified local AR environment; and
sending the local image to a remote workstation for the collaboration session.

16. The non-transitory CRM of claim 15, wherein the computer readable program code, when executed by the computer processor, further comprises functionality for:
capturing, using the local camera and subsequent to stabilization of the change in the local content, a first stabilized image of the local AR environment; and
generating a change area mask that identifies a portion of the first stabilized image that corresponds to the physical object,
wherein the contact overlap mask is generated at least based on the change area mask.

17. The non-transitory CRM of claim 16, wherein the computer readable program code, when executed by the computer processor, further comprises functionality for:
identifying foreground pixels in the remote content,
wherein the contact overlap mask is generated by applying the change area mask to the foreground pixels.

18. The non-transitory CRM of claim 16, wherein the computer readable program code, when executed by the computer processor, further comprises functionality for:
capturing, using the local camera and during the pre-determined time period, a second stabilized image of the local AR environment; and
identifying, based on the change area mask, a portion of the second stabilized image as corresponding to the physical object without being superimposed by the projected remote content,
wherein the local image is generated by updating a previous local image based on the portion of the second stabilized image that corresponds to the physical object without being superimposed by the projected remote content.

19. The non-transitory CRM of claim 15, wherein the computer readable program code, when executed by the computer processor, further comprises functionality for:
identifying, based on the contact overlap mask, a portion of the remote content that corresponds to the content overlap region; and
setting, throughout the pre-determined time period, pixel values of the portion of the remote content to a background pixel value to prevent the projected remote content from superimposing over the physical object within the content overlap region.

20. The non-transitory CRM of claim 19, wherein the computer readable program code, when executed by the computer processor, further comprises functionality for:
resetting, subsequent to the pre-determined time period, the pixel values of the portion of the remote content back to corresponding original pixel values.

* * * * *